United States Patent
Guo et al.

(10) Patent No.: US 6,831,942 B2
(45) Date of Patent: Dec. 14, 2004

(54) MPSK SPREAD SPECTRUM COMMUNICATIONS RECEIVER WITH CARRIER RECOVERY AND TRACKING USING WEIGHTED CORRELATION TECHNIQUES

(75) Inventors: Donghai Guo, Kowloon (HK); Aiqun Hu, Nanjing (CN); Tung Sang Ng, Pokfulam (HK)

(73) Assignee: University of Hong Kong, Hong Kong (HK)

( * ) Notice: Subject to any disclaimer, the term of this patent is extended or adjusted under 35 U.S.C. 154(b) by 748 days.

(21) Appl. No.: 09/761,397

(22) Filed: Jan. 16, 2001

(65) Prior Publication Data

US 2001/0033608 A1 Oct. 25, 2001

Related U.S. Application Data (60) Provisional application No. 60/176,441, filed on Jan. 14, 2000.

(51) Int. Cl.[7] .............................................. H04L 27/30
(52) U.S. Cl. ...................... 375/142; 375/150; 375/261; 375/279; 375/326; 375/367; 370/515
(58) Field of Search ................................. 375/140–143, 375/147, 150, 152, 316, 324–326, 363, 367; 370/503, 515

(56) References Cited

U.S. PATENT DOCUMENTS 5,793,796 A * 8/1998 Hulbert et al. .............. 375/150
6,160,841 A * 12/2000 Stansell et al. ............. 375/148
6,229,843 B1 * 5/2001 Lomp et al. ................ 375/150
6,693,951 B1 * 2/2004 Gilhousen et al. .......... 375/130

* cited by examiner

Primary Examiner—Dac V. Ha
(74) Attorney, Agent, or Firm—Jones Day (57) ABSTRACT

A multiple phase shift keying (MPSK) spread spectrum communications receiver uses weighted correlation techniques for carrier recovery and tracking. The receiver includes three subsystems: a synchronization system, a carrier tracking system, and a data demodulation system. To demodulate the received signal, the receiver requires a carrier frequency that matches the frequency of an associated transmitter as well as the sampling (or chip) and symbol clocks that are synchronized with those of the transmitter. In the disclosed receiver, the carrier tracking subsystem continually tracks the carrier frequency of the received signal using a tracking scheme that uses weighted correlation techniques. The weighted correlation technique combines signals from two correlator modules, an R-correlator module and a W-correlator module, to generate the correlation output. The R-correlator is similar to conventional correlators. The W-correlator, however, is unlike conventional correlators. Each product term of the correlation is weighted by a sampling index within a symbol period and then summed to obtain a weighted correlation value. The receiver has a tracking range that is twice the symbol rate and the tracking range is independent of the number of keying phases M.

34 Claims, 9 Drawing Sheets

Fig. 11 ical fiber, and air. The channel usually distorts the
MPSK SPREAD SPECTRUM COMMUNICATIONS RECEIVER WITH CARRIER RECOVERY AND TRACKING USING WEIGHTED CORRELATION TECHNIQUES This application claims benefit of 60/176,441 filed Jan. 14, 2000.

BACKGROUND

1. Field of the Invention

This invention relates generally to spread spectrum communications systems. More specifically, the disclosed apparatus and method relate to carrier recovery and tracking in MPSK-modulated systems.

2. Description of the Related Art

A communication system is designed to transmit data signals from a source to a destination. The communication system usually includes three components: a transmitter, a channel, and a receiver. The transmitter processes (modulates) the information data into a form that it can be transmitted through the channel. The channel provides a physical medium for signal transmission between the transmitter and the receiver. Examples of a channel are coaxial cable, optical fiber, and air. The channel usually distorts the transmitted signal by the addition of noise and time delay as the signal passes through it. The receiver receives the transmitted signal and processes (also known as demodulates) it to obtain the original information data. Since the signal received from a practical channel is usually distorted and delayed, the receiver generally requires mechanisms such as equalization and synchronization to assist in demodulating the data.

One type of communication system is the mobile communication system in which the signal is transmitted in the form of electromagnetic waves and the transmission channel is air. The mobile phone communication system is a typical example of this type of communication system.

Particularly, one type of spread spectrum mobile communication systems is a Code Division Multiple Access (CDMA) system. As described in *Mobile Cellular Communications* by C. Y. Lee, this type of system operates within a frequency bandwidth much larger than the information bandwidth. Spread spectrum systems perform better in the presence of narrow band noise interference and multiple user interference. A particular CDMA system, a Direct Sequence Code Division Multiple Access (DS-CDMA) system, spreads the data stream in the time domain based upon a given spreading code. Orthogonal spreading codes are often employed among different users to minimize multi-user interference. The received signal at the receiver is correlated with the spreading code so that the desired user signal is enhanced relative to signals from other users. In this way users can share the same time and frequency slot.

Various modulation schemes can be used in DS-CDMA systems. One of the commonly used modulation techniques is Multiple Phase Shift Keying (MPSK), in which the serial data is grouped into $\log_2 M$-bit symbols. Binary phase shift keying (BPSK) and quadrature phase shift keying (QPSK) are particular techniques of MPSK, where M=2 and M=4, respectively. Each information data bit in a MPSK signal is modulated with a pseudo-noise code (PN code) of length N. The spreaded data symbols are up-converted and transmitted on a carrier frequency, $f_c$.

Generally, the tracking range of an MPSK system is limited by the number of keying phases, M. It would be advantageous to design an MPSK receiver having a tracking range independent of the number of keying phases.

SUMMARY OF THE INVENTION

A multiple phase shift keying (MPSK) spread spectrum communications receiver is provided that uses weighted correlation techniques for carrier recovery and tracking. The receiver requires a carrier frequency that matches the frequency of an associated transmitter as well as the sampling (or chip) and symbol clocks that are synchronized with those of the transmitter. In the disclosed receiver, a carrier tracking subsystem continually tracks the carrier frequency of the received signal using a tracking scheme that includes weighted correlation techniques. The weighted correlation technique combines signals from two correlator modules, a conventional correlator module and a weighted correlator module, to generate the correlation output. In the weighted correlator module, each product term of the correlation is weighted by a sampling index within a symbol period and then summed to obtain a weighted correlation value. The receiver has a tracking range that is twice the symbol rate and the tracking range is independent of the number of keying phases M.

One aspect of the spread spectrum communications system includes a transmitter, a receiver, and a channel. The transmitter is configured to transmit an MPSK spread spectrum signal over the channel to the receiver. The receiver includes a carrier frequency tracking module. The carrier frequency tracking module includes a correlator configured to generate weighted correlation values for I-phase and Q-phase channel signals.

Another aspect of the invention includes a spread spectrum communications receiver. The receiver comprises a data demodulation module, a synchronization module, and a carrier frequency tracking module. The carrier frequency tracking module includes a correlator configured to generate weighted correlation values for I-phase and Q-phase channel signals.

Yet another aspect of the invention includes a method for demodulating a spread spectrum communications signal in a receiver. The method comprises the steps of: (1) receiving an MPSK spread spectrum signal; (2) generating a correlation for an I-phase and Q-phase channel; (3) weighting a correlation for an I-phase and Q-phase channel; (4) multiplying the weighted correlation of the I-phase channel with the correlation of the Q-phase channel; (5) multiplying the correlation of the I-phase channel with the weighted correlation of the Q-phase channel; (6) subtracting the results of the multiplication steps to generate an error signal; (7) adjusting a carrier frequency of the receiver; and (8) demodulating the spread spectrum signal.

DETAILED DESCRIPTION OF THE DRAWINGS

Figure 1:
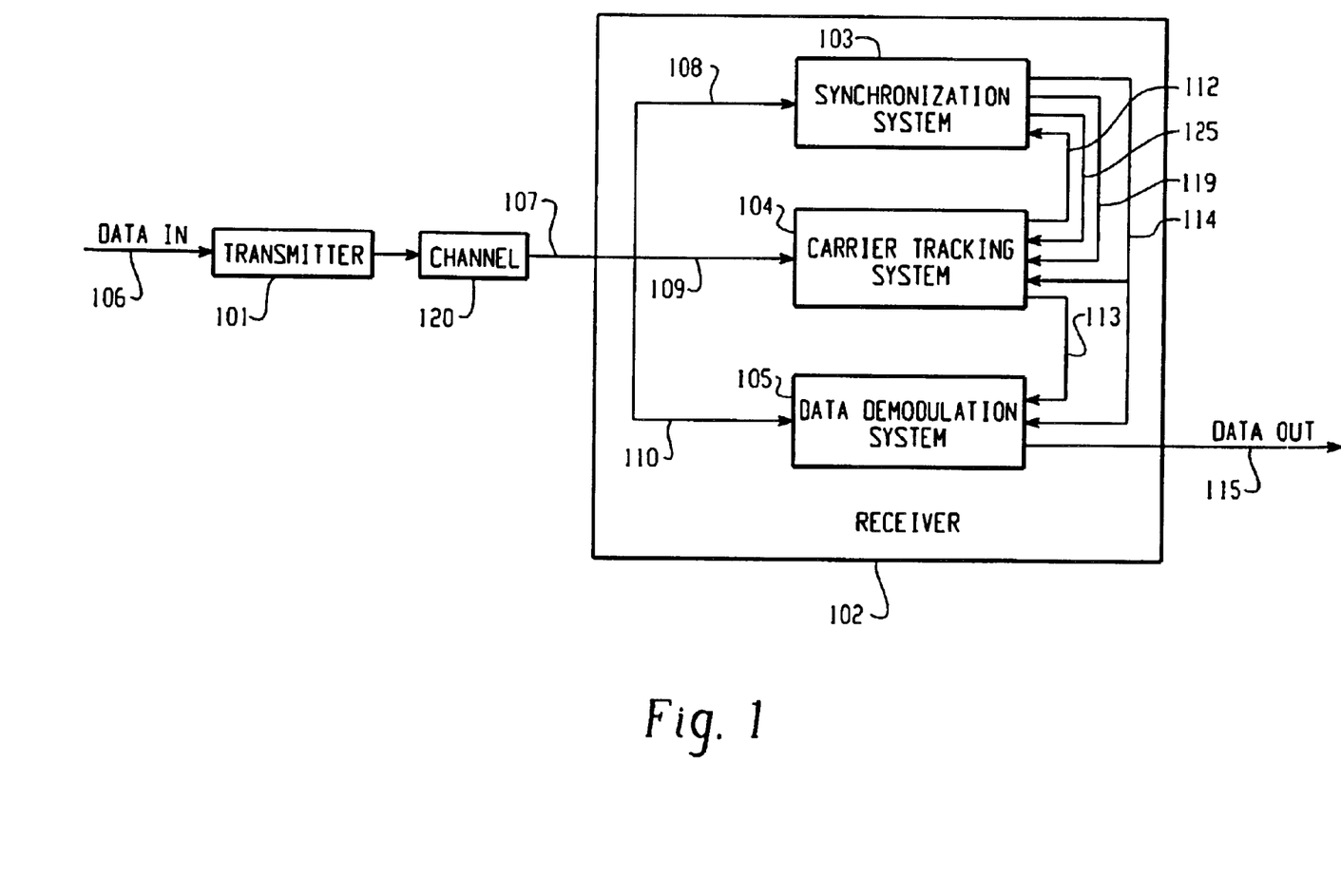
FIG. 1 is a block diagram of an exemplary communication system according to the present invention.

Turning now to the drawing figures, FIG. 1 is a block diagram of an exemplary communication system according to the present invention. The system comprises a transmitter 101, a channel 120 and a receiver 102. The receiver 102 comprises three subsystems: a synchronization system 103, a carrier tracking system 104, and a data demodulation system 105.

Data 106 is fed to the transmitter 101, where it is modulated and transmitted as a transmitted signal 121 across through the channel 120. The transmitted signal 121 passes through the channel 120 as signal 107, which contains noise from the channel 120. The receiver 102 receives the signal 107 from the channel 120 and passes it to the three subsystems 103, 104 and 105. The three subsystems 103, 104, and 105 demodulate the signal 107 and generate a data out signal 115.

The carrier tracking subsystem 104 is configured for carrier recovery and tracking. The carrier tracking subsystem 104 sends control signals 112 to the synchronization subsystem 103 and adjusted frequency signals 113 to the data demodulation subsystem 105. The synchronization subsystem 103 sends a synchronized sampling clock 119 and an acquisition/tracking mode indicating signal 125 to the carrier tracking subsystem 104, as well as the synchronized symbol clock 114 to both the data demodulation subsystem 105 and the carrier tracking subsystem 104. With the adjusted frequency signal 113 from the carrier tracking subsystem 104 and the synchronized symbol clock 114 from the synchronization subsystem 103, the data demodulation subsystem 105 demodulates the received signal 110 into the data out signal 115.

For example, the transmitter 101 may transmit a data modulated MPSK spread spectrum radio frequency (RF) signal across an air channel 120. The signal may comprise m data bits grouped into one symbol where m=$\log_2 M$ is a positive integer and M is the number of keying phases of MPSK signals. The receiver 102 receives the transmitted data signal 107. The receiver can then demodulate the signal in the data demodulation subsystem 110 based upon the synchronization signal 114 from the synchronization system 103 and the adjusted frequency signal 113 from the carrier tracking system 104. The receiver can recover the carrier, track the carrier, and synchronize the received signal 110.

Figure 2:
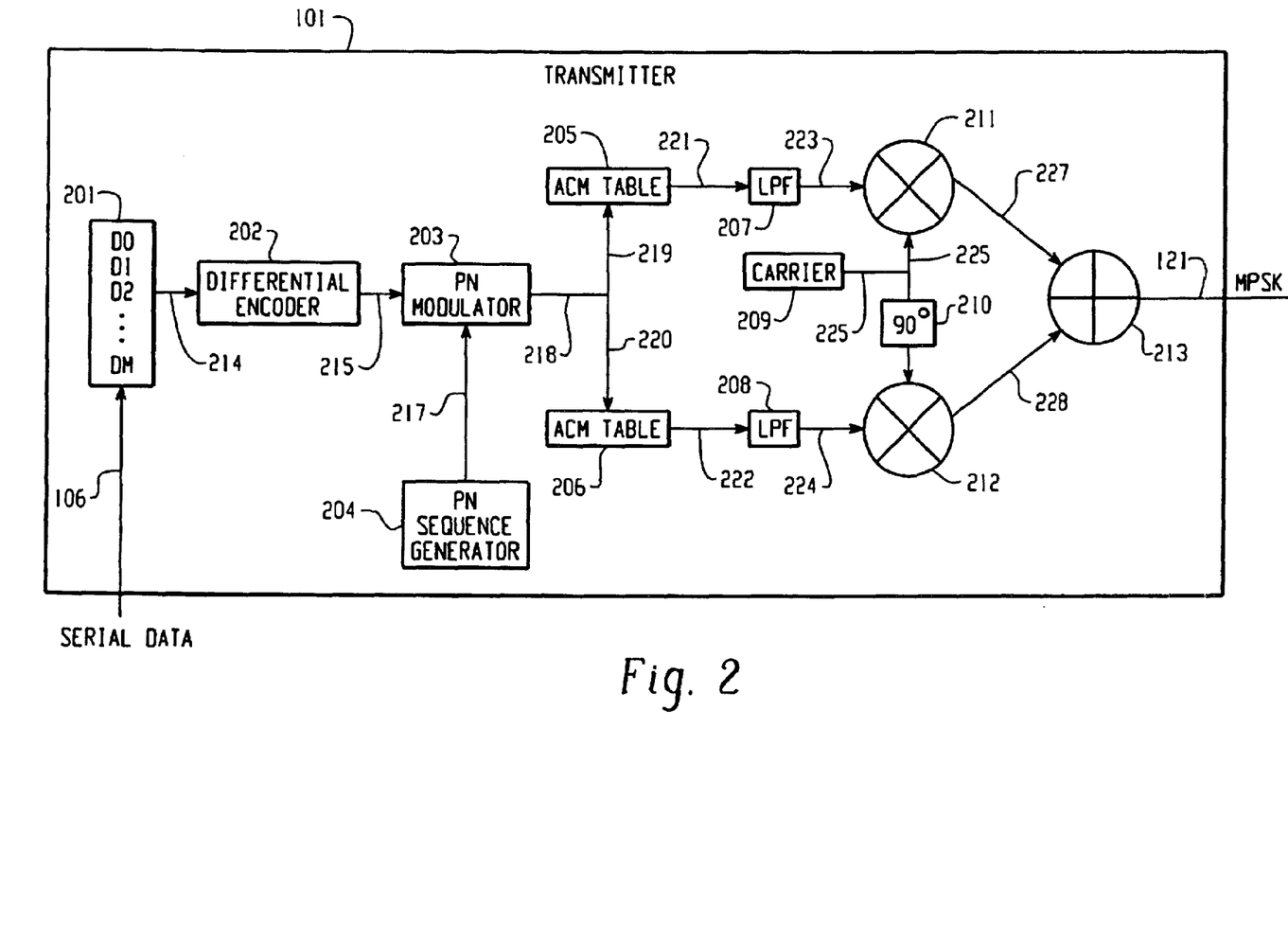
FIG. 2 is a block diagram of the transmitter shown in FIG. 1.

FIG. 2 is a block diagram of the transmitter 101 shown in FIG. 1. The transmitter 101 includes a serial-to-parallel converter 201, a differential encoder 202, a PN modulator 203, a PN sequence generator 204, an Acm table 205 and an Asm table 206, low pass filters 207 and 208, a carrier 209, an orthogonal phase shifter 210, two multipliers 211 and 212, and an adder 213.

The transmitter 101 receives data 106 from the source. The data is converted and modulated in the converter modules 201–204. The in phase I channel and the quadrature phase Q channel are generated and filtered in the channel modules 205–208. The I and Q channels are modulated by a carrier frequency in the up converter modules 209–213. The MPSK signal 121 may then be transmitted from the transmitter 101 to the receiver 102.

In the converter modules 201–204, the data signal 106 is converted to a parallel data signal 214 in the signal-to-parallel converter 201. The differential encoder 202 encodes the data into an encoded output 215. The PN modulator 203 modulates the encoded output 215 with a pseudo-noise signal from the PN sequence generator 204, and again encodes the results in mod M addition into a modulated signal 218.

The transmitter 101 then generates the quadrature phase signal (Q channel) and in-phase signal (I channel) before combining these channels in the adder 213. The modulated signal 218 is split into two similar signals 219 and 220. One signal 219 is sent to the cosine lookup table, Acm table 205. The other signal 220 is sent to the sine lookup table, Asm 206. These tables 205 and 206 store the cosine and sine values, respectively, of different phase values for the Q and I channels. The signals 219 and 220 are addresses for the lookup tables 205 and 206. These addresses are used to determine the values of the M different phases for the signal 218. The output of the tables 205 and 206 are an I channel signal 221 and a Q channel signal 222. The low pass filters 207 and 208 filter the I and Q channel signals 221 and 222, respectively, to limit the bandwidth of the channels and result in bandwidth-limited I and Q channels 223 and 224.

The bandwidth-limited I and Q channels 223 and 224 are combined with a carrier signal 225 so that the channels may be transmitted to the receiver 102. The carrier 209 generates the carrier signal 225. For the I channel signal 223, the carrier signal 225 is sent to the multiplier 211 and combined with the I channel signal 223. For the Q-channel signal 224, the carrier signal 225 is sent to the orthogonal phase shifter 210 before being multiplied with the Q channel signal 224 in the multiplier 212. Output products 227 and 228 of the multipliers 211 and 212 are summed in the adder 213 to form the combined IQ signal, which can then be sent to the receiver 102.

Figure 3:
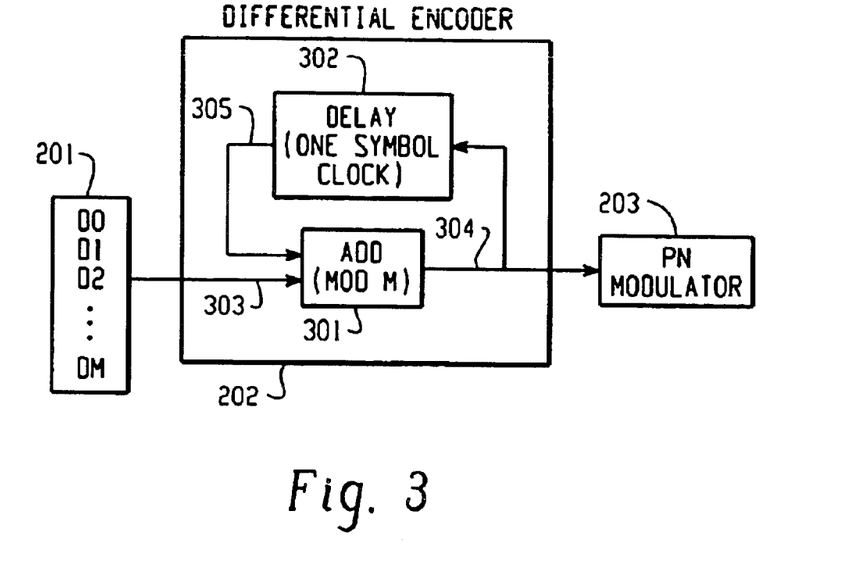
FIG. 3 is a block diagram of the differential encoder of the transmitter shown in FIG. 2.

FIG. 3 is a block diagram of the differential encoder 202 of the transmitter 101 shown in FIG. 2. The differential encoder includes an m-bit modulo adder 301 and an m-bit storage 302. An m-bit symbol 303 is received from the serial-to-parallel converter 201 and sent to the adder 301. The adder 301 sums the m-bit symbol 303 with the successive result 305 of the adder 301. The result 305 is delayed by the storage means 302 for one symbol duration. The addition operation is modulo-M based, where M represents the number of the phases, specifically $2^m$–M. The modulo M-based signal 304 is sent from the differential encoder 202 to the PN modulator 203.

Figure 4:
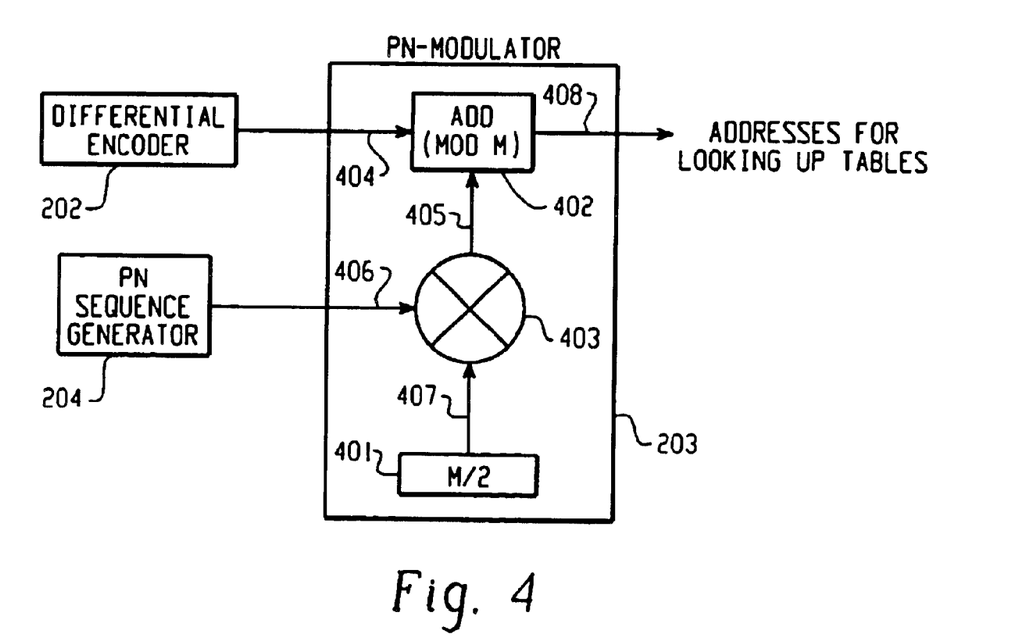
FIG. 4 is a block diagram of the pseudo-noise modulators of the transmitter shown in FIG. 2.

FIG. 4 is a block diagram of the pseudo-noise-modulator 203 of the transmitter 101 shown in FIG. 2. The PN modulator includes a modulo-M adder 402, a multiplier 403 and a register 401. The PN sequence generator 204 generates a PN sequence 406 which is K chips in length. Each chip is multiplied at multiplier 403 with a register signal M/2 407 from register 401. The adder 402 adds the signal from the differential encoder 202 to the multiplication result 405. The addition operation is modulo-M based, where M represents the number of phases. The addition result 408 is used as the address for looking up sine and cosine values in the tables 205 and 206 of FIG. 2. The resultant phase values from the lookup tables 205 and 206 generate the I and Q channel signals 223 and 224 which are modulated on the carrier frequency signal 225. The transmitter 101 sends the signal 121 through the channel 120 to the receiver 102, which receives the MPSK signal 109 that is then sent to each of the three subsystems 103, 104, and 105.

Figure 5:
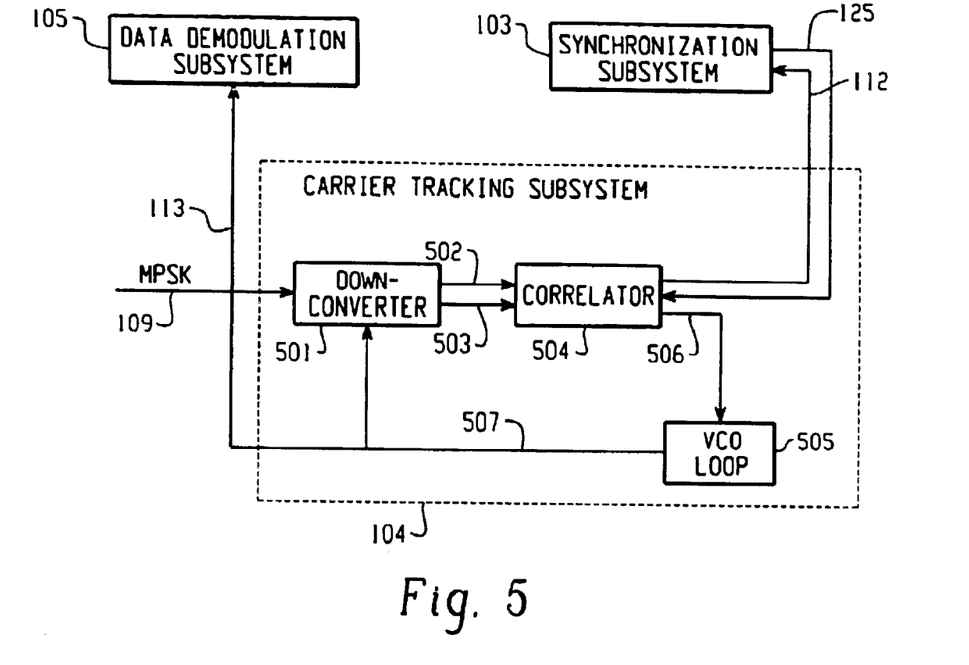
FIG. 5 is a block diagram of the carrier tracking subsystem of the receiver shown in FIG. 1.

FIG. 5 is a block diagram of the carrier tracking subsystem 104 of the receiver 102 shown in FIG. 1. The carrier tracking subsystem 104 includes a down-converter 501, a correlator 504, and a voltage controlled oscillator (VCO) loop 505. The MPSK signal 109 is received and down-converted into I- and Q-channel signals 502 and 503 by the down-converter 501. The I- and Q-channel signals 502 and 503 are sent to the correlator 504, where they are correlated with a local PN sequence, thus generating a frequency error signal 506 and a control signal 112 of FIG. 1. The frequency error signal 506 is the input signal for the VCO loop 505. The VCO loop 505 outputs an adjusted carrier frequency 507 to the down-converter 501 for down-conversion and is also used as signal 113 of FIG. 1 by the data demodulation subsystem 105. The adjusted carrier frequency 507 is the shifted carrier frequency of the MPSK signal 121.

Preferably, the carrier recovery and tracking system includes an RF down-converter 501. The down-converter 501 receives the transmitted data modulated MPSK spread spectrum signals and receives the locally generated carrier frequency signal from the VCO loop 505. The I-phase and Q-phase signals 502 and 503 are correlated with the local PN-sequence in the correlator 504. The output of the correlator 504 is used to adjust the frequency generated by the VCO loop 505. The control signal 112 from the correlator 504 is sent to the synchronization subsystem 103 for clock synchronization.

Figure 6:
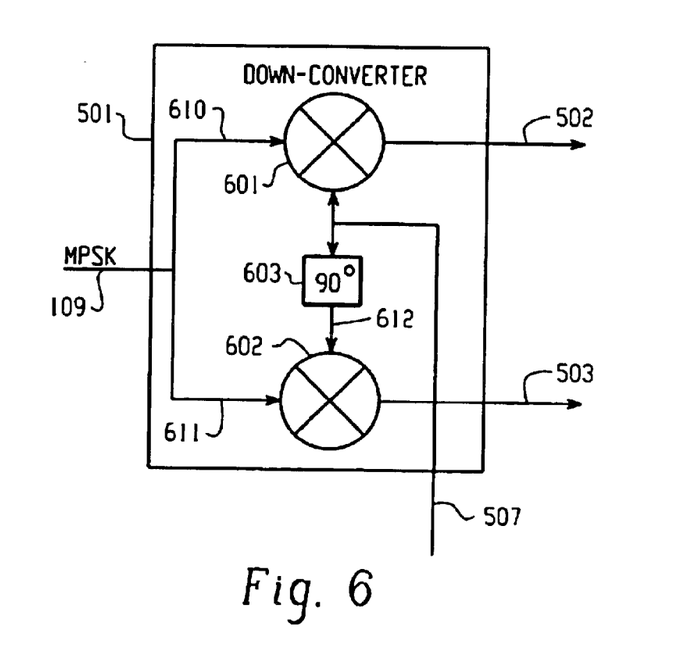
FIG. 6 is a block diagram of the frequency downconverter of the carrier tracking subsystem shown in FIG. 5.

FIG. 6 is a block diagram of the frequency down-converter 501 of the carrier tracking subsystem 103 shown in FIG. 5. The down-converter 501 includes multipliers 601 and 602 and a phase shifter 603. The MPSK signal 109 of FIG. 1 is received and split into two paths 610 and 611 in the down-converter 501. The adjusted frequency signal 507 of FIG. 5 is sent to the down-converter 501 as the carrier frequency for down-converting the signal 109. The adjusted frequency signal 507 is multiplied with a branch of the incoming signal 610 at the multiplier 601. The multiplier product is a base-band I-channel signal 502. The frequency signal 507 is shifted 90° by the phase shifter 603 to form a phase shifted frequency signal 612. The phase shifted frequency signal 612 is multiplied by the incoming split signal 611 in the multiplier 602. The result of the multiplication is a down-converted signal, which is the base-band Q-channel signal 503. The two base-band path signals 502 and 503 are sent to the correlator 504 of FIG. 5.

Figure 7:
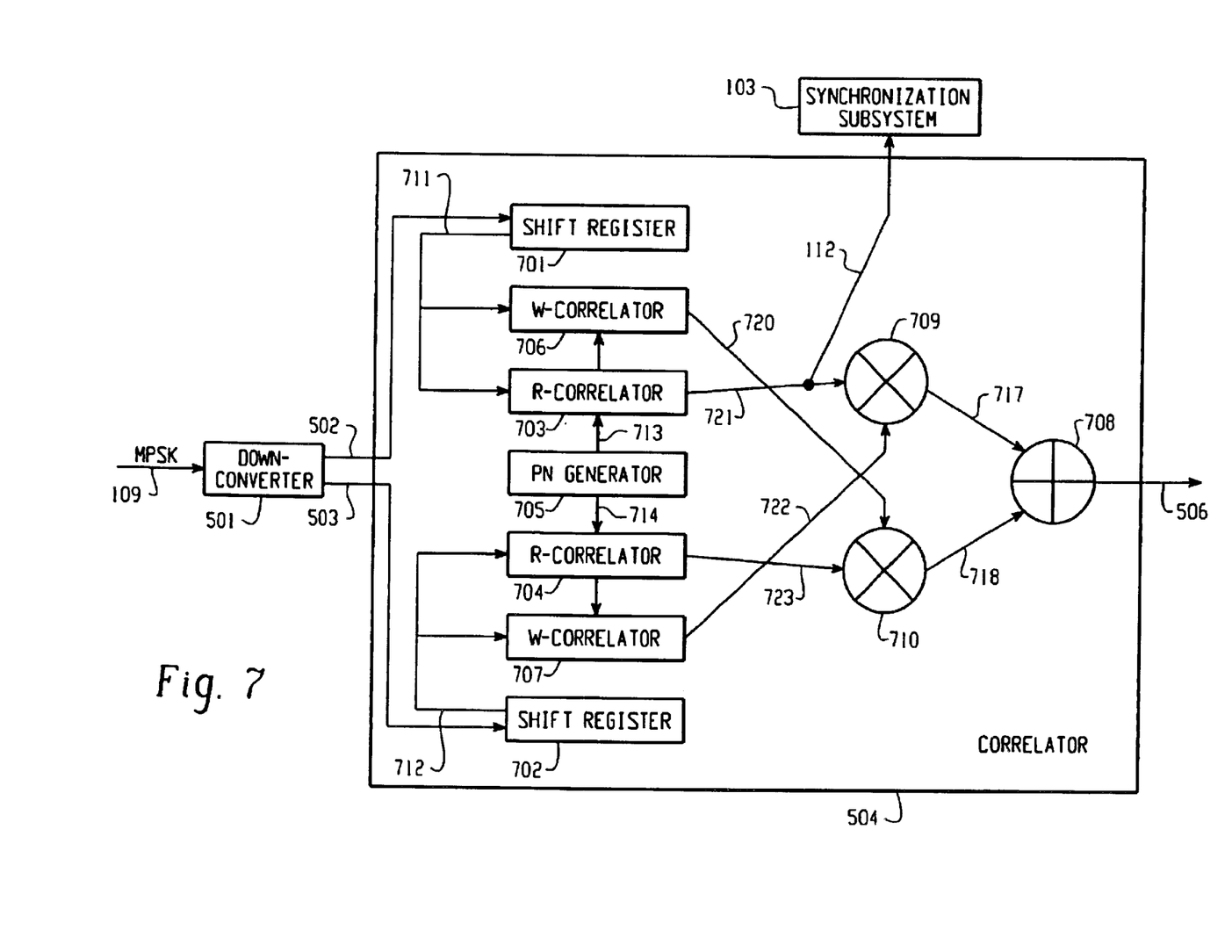
FIG. 7 is a block diagram of the correlator shown in FIG. 5.

FIG. 7 is a block diagram of the correlator 504 shown in FIG. 5. The correlator 504 includes shift registers 701 and 702, R-correlators 703 and 704, W-correlators 706 and 707, a PN generator 705, multipliers 709 and 710, and adder 708. The MPSK signal 109 of FIG. 1 is down-converted at the down-converter 501 into the I-path signal 502 and the Q-path signal 503. The I- and Q-path signals 502 and 503 are sent to parallel shift registers 701 and 702, respectively. The output 711 of shift register 701 is fed to the R- and W-correlators 703 and 706. The R- and W-correlators 703 and 706 are correlated with the local PN-sequence 713 supplied by the PN-generator 705. Similarly., the output 712 of shift register 702 is sent to the R- and W-correlators 704 and 707, where it is correlated with the local PN-sequence 714 from the PN-generator 705.

The correlation result 721 from R-correlator 703, and correlation result 722 from W-correlator 707 are multiplied at multiplier 709, while correlation result 720 from W-correlator 706, and correlation result 723 from R-correlator 704 are multiplied at multiplier 710. The multiplication result 718 from multiplier 710 is subtracted from the multiplication result 717 from multiplier 709 at subtractor 708 to form the error signal 506 of FIG. 5. Correlation signal 721 is also control signal 112, which is fed to the synchronization subsystem 103 of FIG. 1. This control signal 112, when the R-correlator value 721 passes a preset threshold, is used for code acquisition and synchronization as the peak correlation value.

Figure 8:
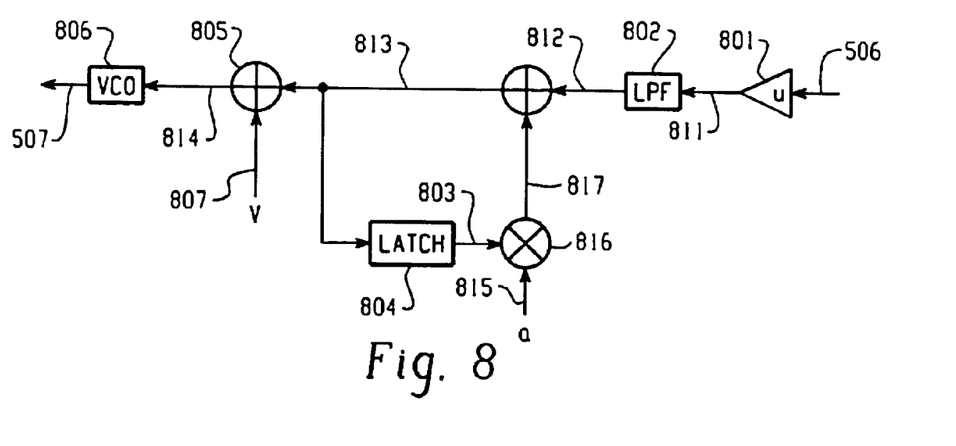
FIG. 8 is a block diagram of the voltage controlled oscillator loop shown in FIG. 5.

FIG. 8 is a block diagram of the voltage controlled oscillator loop 505 shown in FIG. 5. The VCO loop 505 includes a gain amplifier 801, a latch 804, a multiplier 816, adder 805 and 820, and a VCO chip 806. Error signal 506 from correlator 504 of FIG. 5 is scaled by a step-size parameter of the gain amplifier 801 generating a scale input signal 811. The scaled signal 811 is sent to a low-pass filter 802 to limit the bandwidth of the signal 811. Output 812 of the low pass filter 802 is added in adder 820 with a feedback signal 817. The result 813 of the adder 820 is sent to the latch 804 in the feedback loop for the signal 817. The latch 804 delays the result 813 for one symbol period. Output 803 of latch 804 is scaled by a 815, where α is a constant between 0 and 1, in multiplier 816. The scaled result of the multiplier 816 is the feedback signal 817. The resulting signal 813 is added with the reference voltage signal $v_0$ 807 to form the voltage control signal 814 for the VCO 806.

The VCO 806 outputs the adjusted frequency 507 for the down-converter 501 of FIG. 5. The adjusted frequency 507 is the approximation of the shift of the carrier frequency from the carrier frequency of the transmitter 101. The shift in the frequency may be caused by the channel 120. The frequency shift, however, is corrected at the receiver 102 within the VCO loop 505 based on the correlation error signal 506 received from the correlator 504 of the carrier tracking system 104.

The carrier tracking subsystem 104 thus receives an MPSK signal 109 and modulates this signal to output the control signal 112 and carrier frequency signal 113. The control signal 112, which is a timing signal, is sent to the synchronization system 103 where the symbol, chip, and sampling clock frequencies are generated. These frequencies are used in the carrier tracking subsystem 104 and the data demodulation subsystem 105. The carrier frequency signal 113 responds to changes in the carrier frequency by adjusting the carrier frequency according to error signal 506 generated by the correlator 505. The VCO loop 505 matches the error signal 506 in the VCO chip 806 and outputs the adjusted carrier frequency 113.

The correlators 703–706 are used to track the carrier frequency of the MPSK signal 109. The cross multiplication in multipliers 709 and 710 in the correlator 504 weights the results 717 and 718 such that the difference between the results taken in adder 708, error term 506, represents a relative frequency shift of the carrier frequency. Because the W-correlators 706 and 707 correlate the signal for the I channel 502 and Q channel 503, respectively, the products 717 and 718 would only be equal if the carrier frequency has not changed.

Figure 9A:
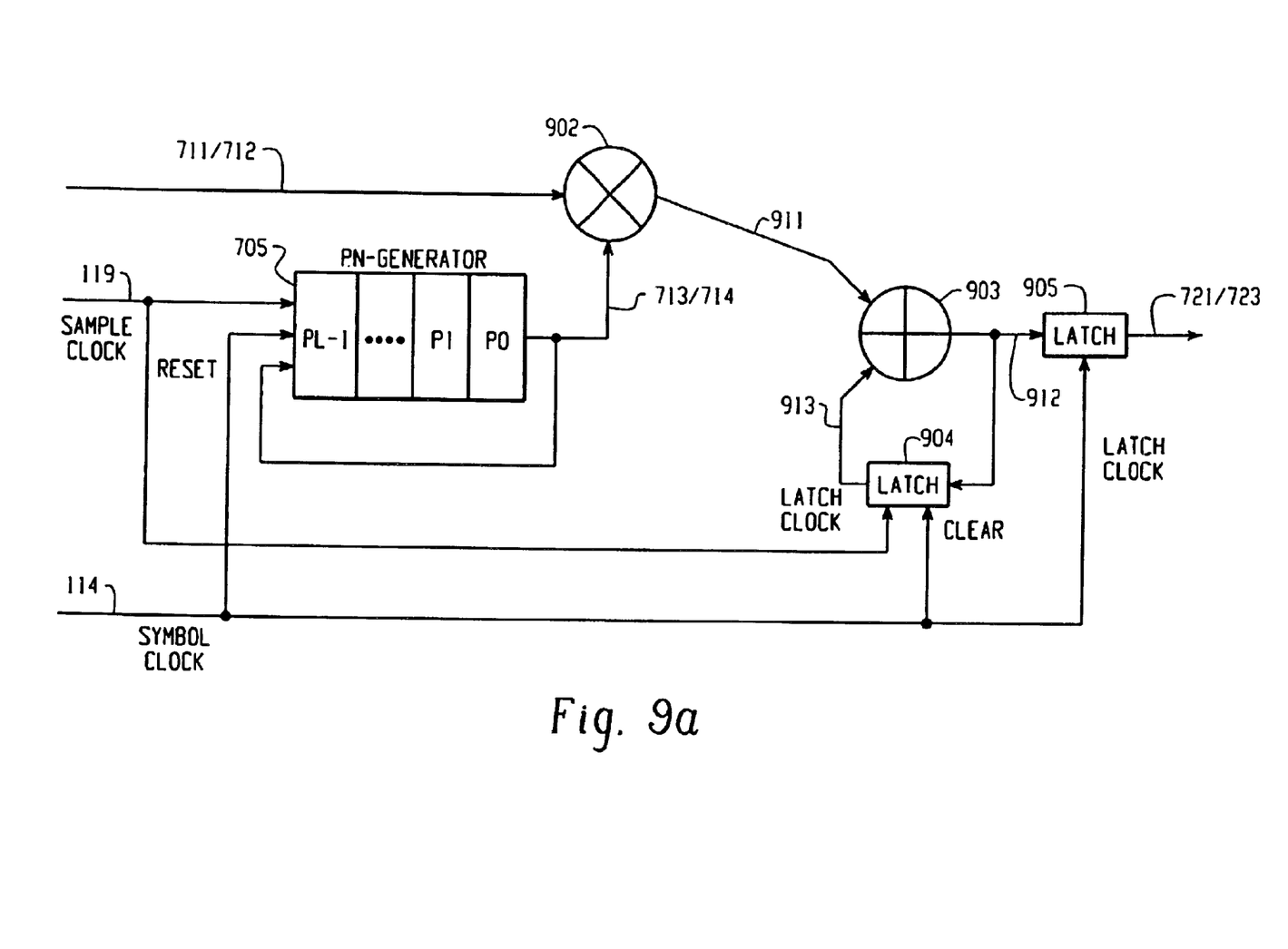
FIG. 9a is a block diagram of the R-correlator shown in FIG. 7.

FIG. 9a is a block diagram of the R-correlators 703 and 704 shown in FIG. 7. The R-correlators 703 and 704 include a PN generator 705, multiplier 902, adder 903, and latches 904 and 905. L sample values of the local PN-sequence are stored in the PN-generator 705 of FIG. 5. These values are shifted by one position for every signal received from the sampling clock signal 119. The synchronized sampling clock signal 119 is supplied by the synchronization subsystem 103 of FIG. 1. The output signal 713/714 (respectively, for R-correlators 703 and 704) of the PN-generator 705 is multiplied with signal 711/712 of FIG. 7 at the multiplier 902 to form multiplication result 911.

Result 911 is sent to the accumulation operation of a feedback loop that includes latch 904 and adder 903. Signal 911 is added with a successive feedback accumulation result 913 from the feedback loop. The feedback accumulation result 913 is stored in latch 904 as long as the symbol clock symbol 114 does not change. Once the symbol clock signal 114 is updated, the latch 905 then captures the accumulation result 912 and outputs the accumulation result 912 as the correlation result 721/723 of FIG. 7. The symbol clock signal 114 also then clears the feedback accumulation result 913 from latch 904 and the PN generator 705 when the latch 905 captures the accumulation result 912.

Figure 9B:
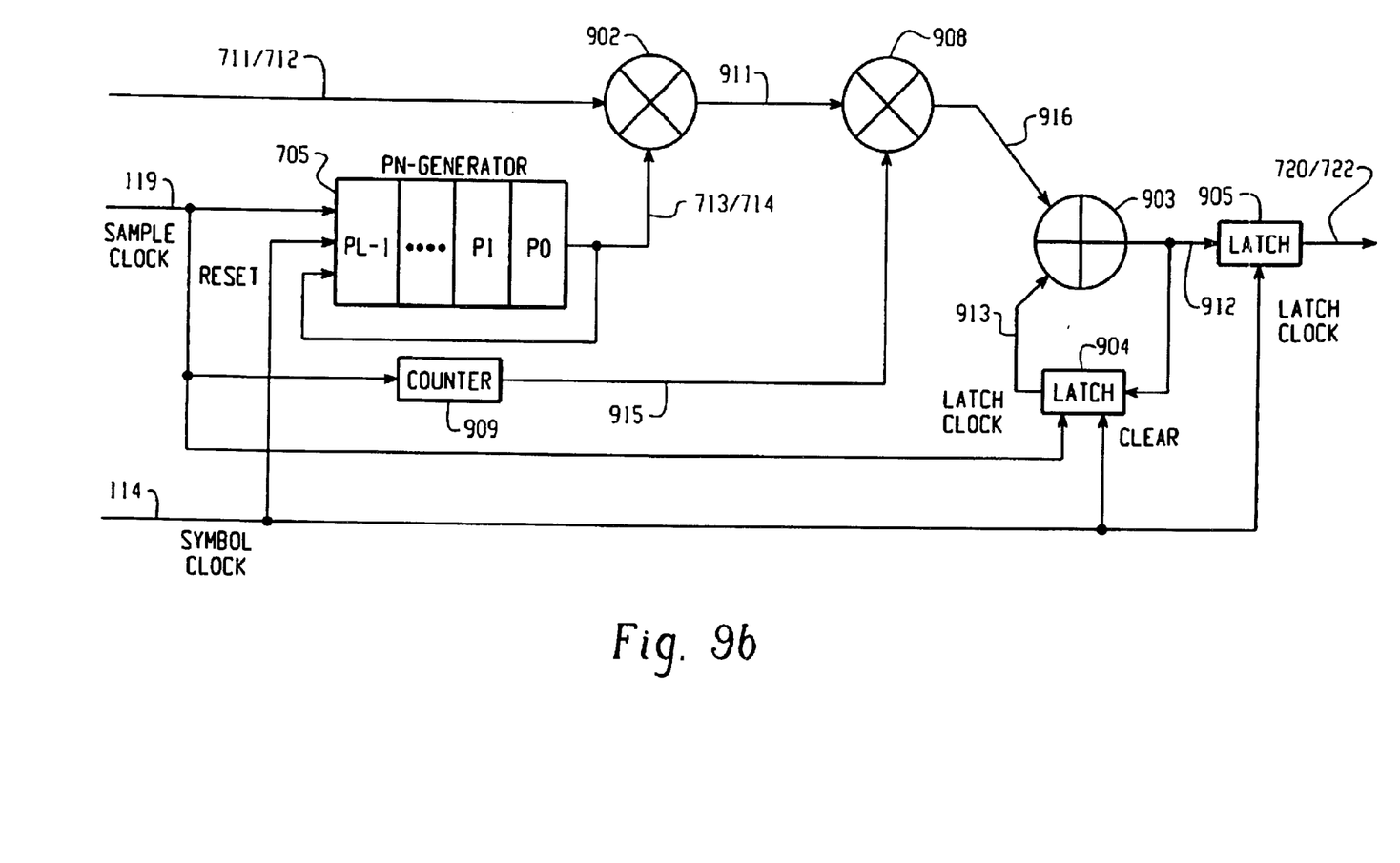
FIG. 9b is a block diagram of the W-correlator shown in FIG. 7.

FIG. 9b is a block diagram of the W-correlators 706 and 707 shown in FIG. 7. The W-correlators 706 and 707 include the PN generator 705, multiplier 902, adder 903, latches 904 and 905, and a counter 909 and multiplier 908 which are part of an index modulator arm. L sample values of the local PN-sequence are stored in the PN-generator 705 of FIG. 5. These values are shifted by one position for every signal received from the sampling clock signal 119. The synchronized sampling clock signal 119 is supplied by the synchronization subsystem 103 of FIG. 1. The output signal 713/14 (respectively, for W-correlators 706 and 707) of the PN-generator 705 is multiplied with signal 711/712 of FIG. 7 at the multiplier 902 to form a multiplication result 911.

The counter 909 stores the sample indexes of one symbol period and is triggered by the sampling clock signal 119. The index signal 915 is multiplied by the multiplication result 911 to weight the correlation values of the correlator 706/1707 in the multiplier 908, generating a weighted result 916. The weighted result 916 is passed to an accumulation process.

Result 916 is sent to the accumulation operation of a feedback loop that includes latch 904 and adder 903. Signal 916 is added with a successive feedback accumulation result 913 from the feedback loop. The feedback accumulation result 913 is stored in latch 904 as long as the symbol clock symbol 114 does not change. Once the symbol clock signal 114 is updated, then the latch 905 captures the accumulation result 912 and outputs the accumulation result 912 as the correlation result 720/722 of FIG. 7. The symbol clock signal 114 also then clears the feedback accumulation result 913 from latch 904 and the PN generator 705 when the latch 905 captures the accumulation result 912.

Figure 10:
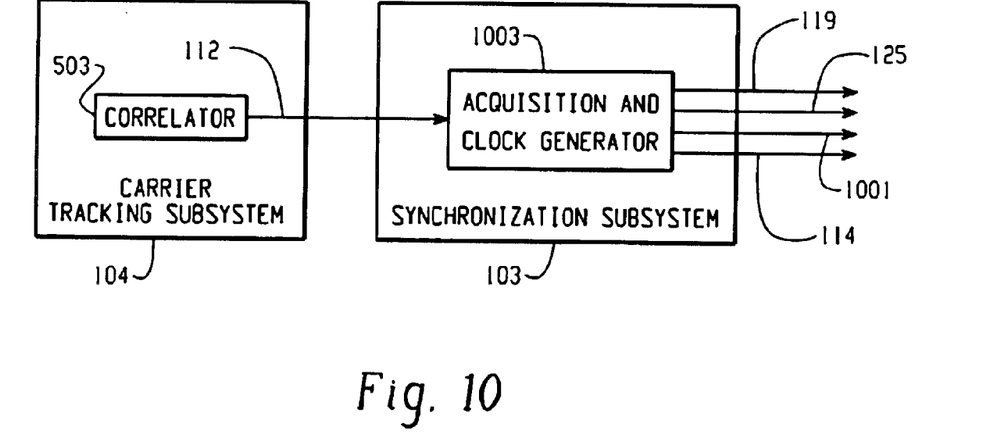
FIG. 10 is a block diagram of the synchronization subsystem shown of the receiver in FIG. 1.

FIG. 10 is a block diagram of the synchronization subsystem 103 of FIG. 1. It comprises an acquisition and clock generation unit 1003, which outputs three frequencies: chip clock frequency 1001, sampling clock frequency 119 of FIG. 1, symbol clock frequency 114 of FIG. 1, as well as an acquisition/tracking mode indicating signal 125. The acquisition and clock generator module 1003 is sent the control signal 112. This control signal 112 is used for code acquisition and synchronization. The control signal is the peak correlation value, as determined in the R-correlator 703. When the peak value occurs, the control signal 112 alerts the acquisition and clock generator module 1003, and the acquisition and clock generator module 1003 can generate the timing signals based on the time the control signal 112 is received.

Figure 11:
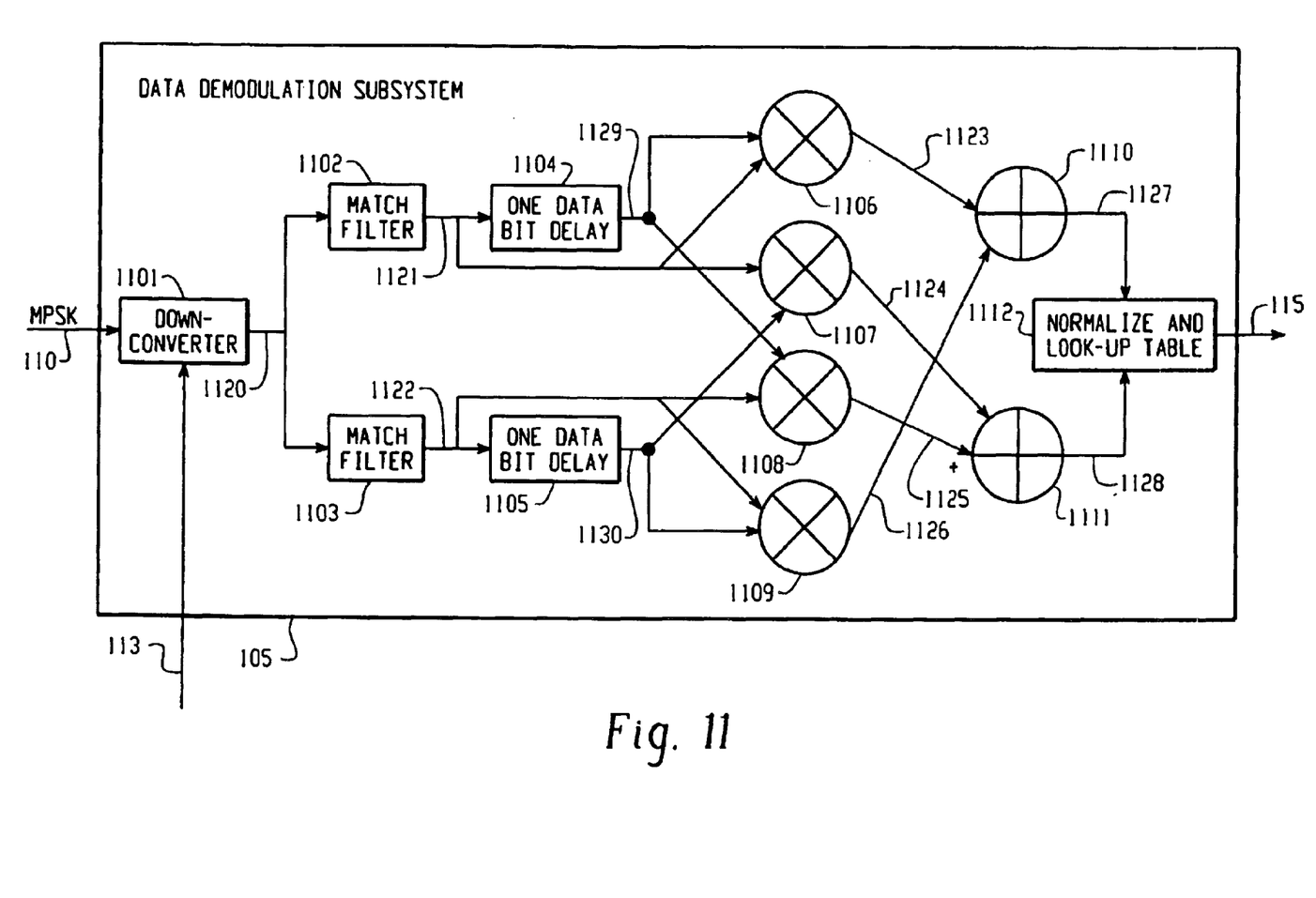
FIG. 11 is a block diagram of the data demodulation subsystem of the receiver shown in FIG. 1.

FIG. 11 is a block diagram of the data demodulation system 105 of the receiver shown in FIG. 1. The data demodulation system 105 includes a down-converter 1101, match filters 1102 and 1103, data bit delays 1104 and 1105, multipliers 1106–1109, adders 1110 and 1111 and a look up table 1112.

The MPSK signal 110 from the transmitter 101 is down-converted at down-converter 1101 by the adjusted carrier signal 113 from the carrier tracking system 104 of FIG. 1 thereby generating a down-converted signal 1120. The down-converted signal 1120 is split into two paths, which pass through two matched filters 1102 and 1103, respectively. Outputs 1121 and 1122 of the matched filters 1102 and 1103 are delayed for one data bit at delays 1104 and 1105 to form delayed signals 1129 and 1130. Delayed signal 1129 and signal 1121 are multiplied at multiplier 1106 to form signal 1123, delayed signal 1121 and signal 1130 are multiplied at multiplier 1107 to form signal 1124, signal 1122 and delayed signal 1129 are multiplied at multiplier 1108 to form signal 1125, and 1122 and 1130 are multiplied at multiplier 1109 to form signal 1126. Signals 1123 and 1126 are combined at adder 1110 to form signal 1127. Signal 1124 is subtracted from 1125 at adder 1111 to form 1128. These multiplication and addition steps generate a pair of addresses 1127 and 1128. The addresses 1127 and 1128 are normalized and used for looking up table values in the normalize and look-up table 1112.

The normalize and look-up table 1112 stores phases of the MPSK modulation and is compared to the phase addresses 1127 and 1128 from the adders 1110 and 1111. If the addresses 1127 and 1128 do not match, then the result is obtained by finding a close set of addresses. The phase addresses can then be chosen by a nearest neighbor approximation, such as a Euclidean distance measure. The result obtained from the table 1112 is the demodulated data 115 of FIG. 1, which matches the data 106 supplied to the transmitter 101.

The down converted, base band signal 1120 is split into the I and Q channel signals. The match filters 1102 and 1103 spread the I and Q channels, respectively, across a greater bandwidth as was represented at the transmitter 101 before the low pass filters 207 and 208 reduced the bandwidth frequency of both the I and Q channels. The I channel 1121 and the Q channel 1122 are multiplied by their own one bit delayed signals 1129 and 1130 to form the real-part of the phase information for demodulation. The cross multiplication of the I channel 1121 and the delayed Q channel 1130 and the cross multiplication of the delayed I channel 1129 and the Q channel 1122 form the imaginary part of the phase information for demodulation. The real part, also known as the COS part of the phase information, and the imaginary part, also known as the SIN part of the phase information, form a phase pair which is used as an address by the look up table 1112 to find the demodulated phase, and thus the demodulated data signal 115.

Having described the invention by way of the drawing figures, it should be understood that this is just an example of the invention, and nothing set forth in this detailed description is meant to limit the invention to this example. Other embodiments, improvements, substitutions, alternatives, or equivalent elements and steps to those set forth in this application are also meant to be within the scope of the invention.

What is claimed is:

1. A spread spectrum communications system, comprising:
   a transmitter configured to transmit an MPSK spread spectrum signal including I-phase and Q-phase channel signals;

a receiver configured to receive the MPSK spread spectrum signal; and a channel configured to carry the MPSK spread spectrum signal from the transmitter to the receiver on a carrier frequency;

wherein the receiver comprises a carrier frequency tracking module having a correlator configured to generate weighted and non-weighted correlation values for the I-phase and Q-phase channel signals, wherein the correlator generates a first product of the weighted correlation values for the I-phase channel and the non-weighted correlation values for the Q-phase channel and a second product of the weighted correlation values for the Q-phase channel and the non-weighted correlation values for the I-phase channel.

2. The system of claim 1, wherein the correlator generates a difference between the first product and the second product, the difference being an error signal representing a shift in the carrier frequency.

3. The system of claim 2, wherein the carrier frequency tracking module comprises a voltage controlled oscillator loop configured to adjust the carrier frequency of the system.

4. The system of claim 3, wherein the carrier frequency tracking module comprises a down converter configured to extract the I-phase and Q-phase channel signals from the MPSK spread spectrum signal using the adjusted carrier frequency generated by the voltage controlled oscillator loop.

5. The system of claim 3, wherein the voltage controlled oscillator loop comprises:

an adder coupled to the error signal and a delayed, proportional version of the error signal that form a combined error output; and a voltage controlled oscillator coupled to the combined error output for generating the adjusted carrier frequency.

6. The system of claim 1, wherein the receiver further comprises a data demodulation module.

7. The system of claim 6, wherein the data demodulation module includes a 90 degree phase shifter configured to receive the MPSK spread spectrum signal and generate the Q-phase channel.

8. The system of claim 7, wherein the data demodulation module comprises a first match filter configured to compress the Q-phase channel.

9. The system of claim 8, wherein the data demodulation module comprises a second match filter configured to compress an I-phase channel.

10. The system of claim 9, wherein the Q-phase channel and the I-phase channel are multiplied by one-bit-delayed versions of respective channels and summed in order to generate the real phase information for demodulation.

11. The system of claim 10, wherein the Q-phase channel is multiplied by the one-bit-delayed I-phase channel and the I-phase channel is multiplied by the one-bit-delayed Q-phase channel in order to generate an imaginary phase information for demodulation.

12. The system of claim 11, wherein the data demodulation module comprises a phase table for storing a plurality of MPSK symbols that are addressed using the real phase information and the imaginary phase information.

13. The system of claim 12, wherein the data demodulation module comprises a distance measure that measures a distance between the real and imaginary phase information and the address to the MPSK symbol stored in the phase table.

14. A spread spectrum communications receiver, comprising:

a data demodulation module;

a synchronization module; and a carrier frequency tracking module having a correlator configured to generate weighted and non-weighted correlation values for I-phase and Q-phase channel signals, wherein the correlator generates a first product of the weighted correlation values for the I-phase channel and the non-weighted correlation values for the Q-phase channel and a second product of the weighted correlation values for the Q-phase channel and the non-weighted correlation values for the I-phase channel.

15. The receiver of claim 14, wherein the correlator generates a difference between the first product and the second product, the difference being an error signal representing a shift in the carrier frequency.

16. The receiver of claim 15, wherein the carrier frequency tracking module comprises a voltage controlled oscillator loop configured to adjust the carrier frequency of the system.

17. The receiver of claim 16, wherein the carrier frequency tracking module comprises a down converter configured to extract the I-phase and Q-phase channel signals from the MPSK spread spectrum signal using the adjusted carrier frequency generated by the voltage controlled oscillator loop.

18. The receiver claim 16, wherein the voltage controlled oscillator loop comprises:

an adder coupled to the error signal and a delayed, proportional version of the error signal that form a combined error output; and a voltage controlled oscillator coupled to the combined error output for generating the adjusted carrier frequency.

19. The receiver of claim 14, wherein the data demodulation module includes a 90 degree phase shifter configured to receive the MPSK spread spectrum signal and generate the Q-phase channel.

20. The receiver of claim 19, wherein the data demodulation module comprises a first match filter configured to compress the Q-phase channel.

21. The receiver of claim 20, wherein the data demodulation module comprises a second match filter configured to compress an I-phase channel.

22. The receiver of claim 21, wherein the Q-phase channel and the I-phase channel are multiplied by one-bit-delayed versions of respective channels and summed in order to generate a real phase information for demodulation.

23. The receiver of claim 22, wherein the Q-phase channel is multiplied by the one-bit-delayed I-phase channel and the I-phase channel is multiplied by the one-bit-delayed Q-phase channel in order to generate an imaginary phase information for demodulation.

24. The receiver of claim 23, wherein the data demodulation module comprises a phase table for storing a plurality of MPSK symbols that are addressed using the real phase information and the imaginary phase information.

25. The receiver of claim 24, wherein the data demodulation module comprises a distance measure that measures the distance between the real and imaginary phase information and the address of the MPSK ssymbol stored in the phase table.

26. The receiver of claim 20, wherein the data demodulation module comprises a distance measure that measures a distance between real and imaginary phase information and an address to the MPSK symbol stored in the phase table.

27. A method for demodulating a spread spectrum communications signal in a receiver, comprising the steps of:

receiving an MPSK spread spectrum signal;

generating a correlation for an I-phase and Q-phase channel;

weighting the correlation for the I-phase and Q-phase channel;

multiplying the weighted correlation of the I-phase channel with the correlation of the Q-phase channel to generate a first product;

multiplying the correlation of the I-phase channel with the weighted correlation of the Q-phase channel to generate a second product;

obtaining a difference between the first and second products to generate an error signal;

adjusting a carrier frequency of the receiver on the basis of the error signal; and demodulating the spread spectrum signal.

28. The method of claim 27, wherein the demodulation step comprises:

down-converting the MPSK spread spectrum signal using the adjusted carrier frequency;

generating real phase information from the I-phase channel and Q-phase channel;

generating imaginary phase information from the I-phase channel and Q-phase channel; and tabulating the phase of the MPSK signal wherein the real phase information and the imaginary phase information are addresses in a phase table.

29. The method of claim 28, wherein the tabulating step further comprises generating a nearest neighbor approximation to the addresses in the phase table.

30. A spread spectrum communications system, comprising:

a transmitter configured to transmit an MPSK spread spectrum signal including I-phase and Q-phase channel signals;

a receiver configured to receive the MPSK spread spectrum signal; and a channel configured to carry the MPSK spread spectrum signal from the transmitter to the receiver on a carrier frequency;

wherein the receiver comprises:

a carrier frequency tracking module having a correlator configured to generate weighted correlation values for the I-phase and Q-phase channel signals; and a data demodulation module including a 90 degree phase shifter configured to receive the MPSK spread spectrum signal and generate the Q-phase channel, the data demodulation module comprising a first match filter configured to compress the Q-phase channel and a second match filter configured to compress the I-phase channel, wherein the Q-phase channel and the I-phase channel are multiplied by one-bit-delayed versions of respective channels and summed in order to generate the real phase information for demodulation, and wherein the Q-phase channel is multiplied by the one-bit-delayed I-phase channel and the I-phase channel is multiplied by the one-bit-delayed Q-phase channel in order to generate the imaginary phase information for demodulation.

31. The system of claim 30, wherein the data demodulation module comprises a phase table for storing a plurality of MPSK symbols that are addressed using the real phase information and the imaginary phase information.

32. A spread spectrum communications receiver, comprising:

a data demodulation module;

a synchronization module; and a carrier frequency tracking module having a correlator configured to generate weighted correlation values for I-phase and Q-phase channel signals;

wherein the data demodulation module includes a 90 degree phase shifter configured to receive an MPSK spread spectrum signal and to generate the Q-phase channel, a first match filter configured to compress the Q-phase channel, and a second match filter configured to compress the I-phase channel, wherein the Q-phase channel and the I-phase channel are multiplied by one-bit-delayed versions of the respective channels and summed in order to generate a real phase information for demodulation, and wherein the Q-phase channel is multiplied by the one-bit-delayed I-phase channel and the I-phase channel is multiplied by the one-bit-delayed Q-phase channel in order to generate an imaginary phase information for demodulation.

33. The receiver of claim 32, wherein the data demodulation module comprises a phase table for storing a plurality of MPSK symbols that are addressed using the real phase information and the imaginary phase information.

34. The receiver of claim 33, wherein the data demodulation module comprises a distance measure that measures a distance between the real and imaginary phase information and the address of the MPSK symbol stored in the phase table.

* * * * *

UNITED STATES PATENT AND TRADEMARK OFFICE
CERTIFICATE OF CORRECTION

PATENT NO. : 6,831,942 B2
DATED : December 14, 2004
INVENTOR(S) : Guo et al.

It is certified that error appears in the above-identified patent and that said Letters Patent is hereby corrected as shown below:

Column 10,
Line 26, after "receiver" insert -- of --.
Line 60, delete "ssymbol" and insert -- symbol --.

Signed and Sealed this

Third Day of May, 2005

JON W. DUDAS
*Director of the United States Patent and Trademark Office*